Figure 1:
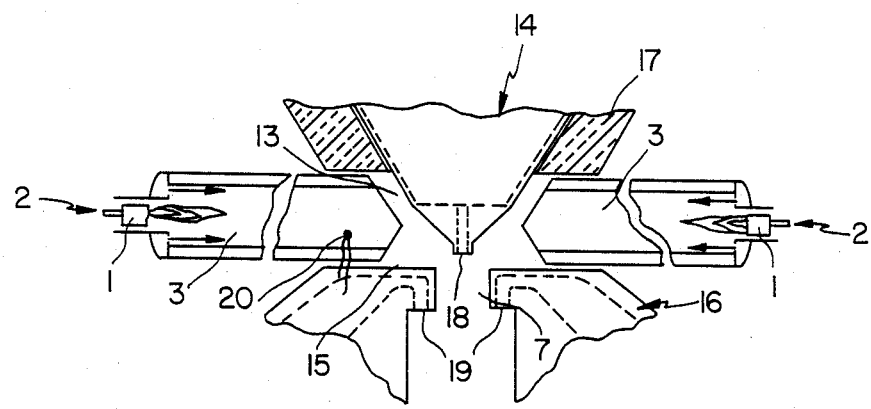

United States Patent [19]

Wagner et al.

[11] Patent Number: 4,838,917
[45] Date of Patent: Jun. 13, 1989

[54] PROCESS AND APPARATUS FOR THE PRODUCTION OF VERY FINE MINERAL FIBERS, IN PARTICULAR GLASS FIBERS

[75] Inventors: Wolfram Wagner; Roger Nyssen, both of Dormagen; Dirk Berkenhaus, Koeln; Hans-Theo van Pey, Bedburg/Lipp., all of Fed. Rep. of Germany

[73] Assignee: Bayer Aktiengesellschaft, Leverkusen, Fed. Rep. of Germany

[21] Appl. No.: 150,682

[22] Filed: Feb. 1, 1988

[30] Foreign Application Priority Data

Feb. 14, 1987 [DE] Fed. Rep. of Germany ....... 3704692

[51] Int. Cl.$^4$ ............................................. C03B 37/06
[52] U.S. Cl. ................................................. 65/5; 65/16
[58] Field of Search .......................................... 65/5, 16

[56] References Cited

U.S. PATENT DOCUMENTS

| | | | | |
|---|---|---|---|---|
| 3,015,127 | 1/1962 | Stalego | ...................................... | 65/5 |
| 3,352,653 | 11/1967 | Speth | .................................... | 65/16 X |
| 3,395,005 | 7/1968 | Stelmah | .............................. | 65/16 X |

FOREIGN PATENT DOCUMENTS

| | | | | |
|---|---|---|---|---|
| 972326 | 1/1951 | France | ..................................... | 65/16 |
| 392014 | 1/1974 | U.S.S.R. | .................................... | 65/16 |

*Primary Examiner*—Robert L. Lindsay

*Attorney, Agent, or Firm*—Sprung, Horn, Kramer & Woods

[57] ABSTRACT

The streams of melt issuing from the melt outlet apertures (18) at the bottom of a melting crucible (14) are broken up into fibers in a drawing nozzle by means of a blast medium directed substantially parallel to the streams of melt. The blast medium is produced by a pressure gradient in the drawing nozzle and sucked in at the drawing nozzle inlet (7). In the drawing nozzle (16), the flow velocity is reduced in a downstream diffuser after the drawing process. The blast medium is supplied in the form of a hot gas between the underside of the crucible and the top edge (15) of the drawing nozzle from opposite broadsides of the melt distributor (14) in excess to the total quantity of gas stream sucked in at the drawing nozzle inlet (7). The hot gas consists of a mixture of combustion gases and air and is at a temperature from 600° C. to 1500° C., preferably from 800° C. to 1400° C. The flow velocity of the hot gas is adjusted to a value below 100 m/s, preferably 50 m/s, in the region (13) between the drawing nozzle (16) and the melt distributor (14). Gas burners (1) provided for producing the hot gas are arranged with their combustion chambers (3) situated laterally between the melt distributor (14) and the top edge (15) of the debiteuse. The combustion chambers (3) are connected by bores (6) to air chambers which are under an excess pressure. In the combustion chambers (3), the combustion gases are homogeneously mixed with the air introduced.

14 Claims, 3 Drawing Sheets

PROCESS AND APPARATUS FOR THE PRODUCTION OF VERY FINE MINERAL FIBERS, IN PARTICULAR GLASS FIBERS

This invention relates to a process for the production of mineral fibres, in particular glass fibres with a diameter of from 0.1 to 5 μm, preferably from 0.1 μm to 2 μm, by the blast drawing process, in which streams of melt issue from apertures at the bottom of a melting crucible and are broken up into fibres in a debiteuse situated down stream of the crucible by means of a blast medium flowing substantially parallel to the streams of melt, this blast medium being sucked into the debiteuse by a pressure gradient produced between the drawing nozzle inlet and outlet, and the flow velocity being reduced in a diffuser situated downstream of the drawing nozzle.

A process of this type has been described, for example, in EP 38 989. Various measures for modifying the blast drawing process have been described in EP 200 071, all aimed at producing glass fibres with a minimum diameter. It has been found that the fibre diameter cannot be reduced indefinitely by means of these or similar measures. In particular, economical considerations limit the extent to which the size of the outlet openings in the melting crucible can be reduced since this reduction in size is accompanied by a reduction in the overall stream of mass passing through the debiteuse and therefore a reduction in yield. In addition, it is aimed to use glasses with a relatively high viscosity as starting material, e.g. E-glass, and produce from them very economical fibres with the smallest possible average diameter and the proportion of non-fibrous constituents, i.e. so called fibre defects such as beads, thickenings, knots, bundles, etc. should be reduced to the minimum.

The present invention solves this problem on the basis of the process described above by the following means: the blast medium, which is hot gas at a temperature of 600° to 1500° C., preferably 800° to 1400° C., consisting of flame gases with a homogeneous admixture of air is supplied from opposite broadsides of the melting crucible, to the space between the underside of the crucible and the top edge of the debiteuse in an amount which is in excess of the total quantity of gas stream sucked in at the inlet of the debiteuse, and the flow velocity of the hot gas is adjusted to a value between 100 m/sec preferably below 50 m/sec, between the drawing nozzle and the bottom of the melting crucible. The excess of hot gas should be from 1 to 20%, preferably from 1 to 10% of the total stream of hot gas sucked in by the drawing nozzle. This means that at least 80% by mass of the stream of hot gas produced is passed through the drawing nozzle while the remainder flows off sideways at the inlet of the drawing nozzle.

The method of supplying hot gas according to the invention prevents cooling of the melt distributor in the region of the outlet apertures and may also contribute to heating part of the melt distributor. The clean atmosphere of hot gas between the inlet of the drawing nozzle and the underside of the crucible also prevents particles of dirt being sucked in. Further, it has been found that the wear of the platinum melt distributor by abrasion is reduced due to the low gas density of the stream of hot gas, so that a long service life for the melt crucible is ensured even when the melt distributor operates at high temperatures (about 1500° C.).

The hot gas supply according to the invention also provides for a further development of the process, according to which the temperature of the hot gas is measured at the inlet of the debiteuse and is automatically regulated by readjustment of the supply of fuel gas and/or air. As a result, the blast medium is supplied at a constant temperature.

The apparatus for carrying out process according to the invention is based on a melting crucible with outlet apertures and, arranged underneath this crucible, a debiteuse in which the primary melt threads issuing from the crucible are broken up into fibres by the action of a hot gas and drawn, and gas burners for producing the hot gas in the region between the drawing nozzle and the bottom of the melting crucible. According to the invention, the gas burners are arranged with their combustion chambers situated laterally between the melting crucible and the top edge of the drawing nozzle, and the combustion chambers are connected by bores to air chambers which are under a bias pressure of from 1.1 to 2.0 bar (absolute). This means that apart from relatively small gaps which are necessary for reasons of tolerance, the combustion chambers of the gas burners are contiguous laterally with the melting crucible and the top surface of the debiteuse so that the space between the underside of the crucible and the top edge of the drawing nozzle, including the combustion chambers, forms a quasi closed system.

The combustion chambers, which are designed as mixing chambers for thorough, homogeneous mixing of the flame gases with the air fed in through the bores, preferably have a length of from 100 to 500 mm, in particular from 200 to 400 mm.

The above mentioned flow velocities of the hot gas, which should be below 100 m/s, therefore apply to the outlet cross section of the mixing chambers.

Further improvements and special embodiments of the invention are described in the sub claims.

In addition to the advantages described above, the invention provides the following advantageous effects and results:

1. Owing to the excess of hot gas at the inlet of the debiteuse, no cold air can be sucked in from outside. As a result, the temperature is very constant in the critical region of the inlet flow. Temperature gradients transversely to the axis of the debiteuse can be avoided. This condition is fulfilled even when the inflow velocity of the hot gas or the outflow velocity of the hot gas from the combustion chambers is relatively low. Hot gas flow velocities of less than 50 m/s may be employed at the outlet of the combustion chambers. The long combustion and mixing chambers between the drawing nozzle inlet and the burners are advantageous in this respect.

2. Since the maximum attainable velocity of the suction air in the drawing nozzle inlet is equal to the speed of sound and the speed of sound increases with temperature, it is possible to achieve higher limiting velocities and hence higher drawing velocities in the drawing nozzle. At the same time, the rate of cooling of the primary melt streams in the drawing nozzle is thereby reduced. Both these effects are highly important for the production of very fine glass fibres.

3. From an economical point of view, an improvement in efficiency is obtained since the high temperatures of the hot gas, which enable the total mass stream sucked through the drawing nozzle to be reduced, requires less acceleration work to be expended by the driving jets. Known art processes in which hot gas streams are employed in a similar manner for drawing the fibres require a higher kinetic energy and/or higher temperatures and hence also a higher consumption of hot gas per kilogram of fibres compared with the process according to the invention.

4. The above mentioned increase in length of the drawing path due to the high temperatures of the hot gas also results in a higher standard of quality of the fibrous material. The proportion of material which is not broken up into fibres (e.g. beads, thickenings, bunches etc.) can be markedly reduced.

5. It has been found that the high temperature of the blast medium combined with the increase in length of the drawing path also enables the very finest glass fibres to be produced from melts of relatively high viscosity. With the known blast drawing processes, only relatively coarse fibres have hitherto been able to be produced with a uniform diameter (low diameter scattering).

Figure 2:
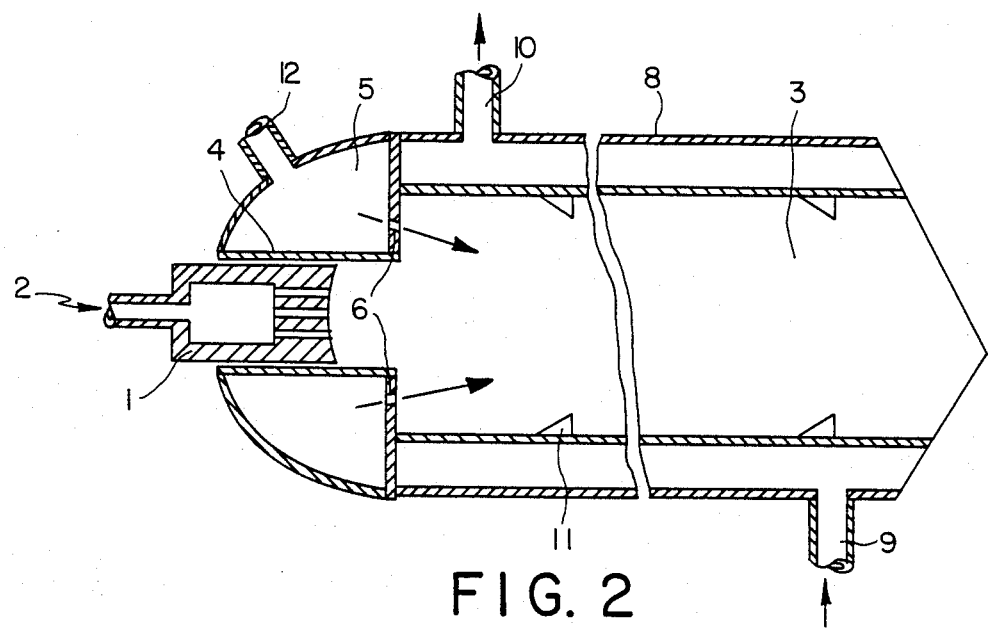
Figure 3:
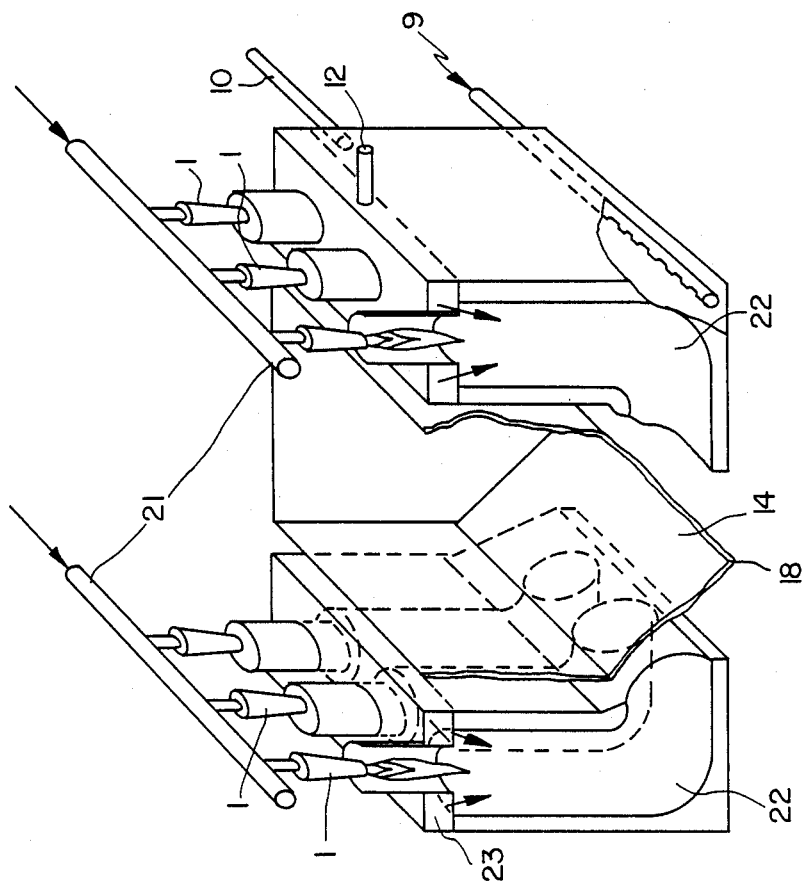
Figure 4:
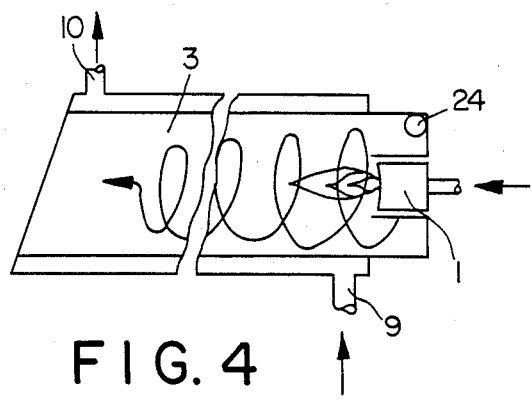
Figure 5:
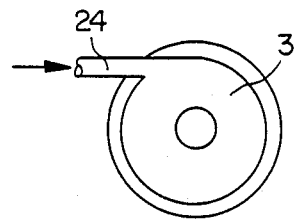
Figure 6:
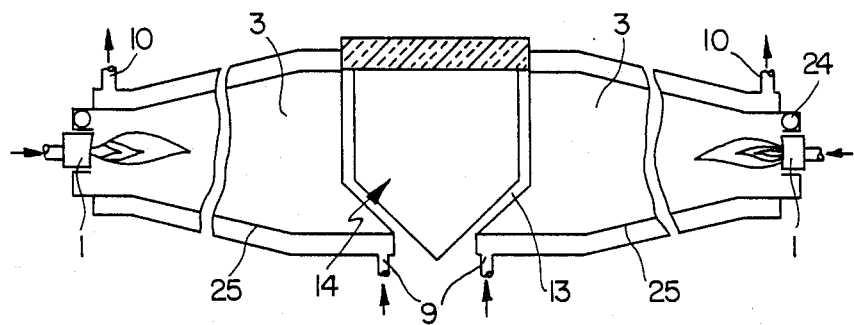

Exemplary embodiments of the invention are described below with reference to the drawings, in which FIG. 1 shows the supply of hot gas at the inlet of the debiteuse, FIG. 2 shows a burner with adjacent mixing chamber for producing the hot gas, FIG. 3 shows an apparatus for hot gas production with vertical burners arranged parallel to the melting crucible, FIGS. 4 and 5 show a combustion and mixing chamber with tangential supply of air and FIG. 6 shows a hot gas supply with laterally arranged combustion and mixing chambers and tangential supply of air.

According to FIG. 1, a stochiometric mixture 2 of fuel gas/air or fuel gas/O₂ is introduced into a combustion chamber 3 from a flame burner 1 and is ignited with an outlet velocity from the burner nozzle below the velocity of flame propagation. As shown in FIG. 2, the burner nozzle is tightly inserted in a channel 4 which, together with an air distributor chamber 5, closes the combustion chamber 3 centrally on the side of the burner. Bores 6 through which air is blown from the chamber 5 towards the stream of flame at an angle of 0° to 30° are situated in the wall of the combustion chamber 3 at intervals of 10 to 30 mm, approximately at the height of the mouth of the burner nozzle. The initial pressure in the chamber 5 is from 1.1 to 2.0 bar (absolute). The mass stream of injected air in addition to the combustion gas is 1.02 to 1.2 times the mass stream which is required in dependence upon the desired temperature and at the speed of sound in the debiteuse inlet 7. The combustion gas is completely burnt in the first region of the combustion chamber 3 and is uniformly mixed with the injected air so that a homogeneous temperature distribution is obtained at the end of the combustion or mixing chamber 3. For this purpose, the mixing chamber 3 has a uniform, circular cross section over a relatively great length of 500 mm. Furthermore, the mixing chamber 3 is provided with a cooling jacket 8 which has connections 9 and 10 for cooling water. In addition, flow obstructions 11 (baffles) may be built into the mixing chamber 3 to ensure more thorough mixing of the air fed in through the bores 6 and the combustion gas. The air required for maintaining a constant bias pressure in the chamber 5 is supplied through the inlet 12.

The mixing chambers 3 open into a space 13 between the underside of the melting crucible 14 and the top edge 15 of the drawing nozzle 16. The tubular mixing chambers 3 form an almost tight fit with these parts so that the space 13 remains a quasi closed system. The melting crucible 14 is thermally insulated (17) on the outside. The melt outlet apertures 18 on the underside of the crucible are situated centrally above the debiteuse inlet 7. The pressure gradient required in the drawing nozzle 16 for breaking the threads up into fibres is produced in known manner by driving jets (driving jet nozzles 19). The blast medium for this purpose consists exclusively of the hot gas which issues from the mixing chambers 3 and is sucked in by the debiteuse 16.

The hot gas is produced in the mixing chambers 3 by mixing of the exhaust gases (combustion gases) produced by the combustion process with the air fed in through the chamber 5 and the bores 6. A temperature probe for regulating the hot gas temperature is arranged at the exit from the burner chambers 3. The control parameter employed is the mass stream of supplied air and/or the burner output, which is adjusted by the rate of supply of fuel. Part of the hot gas flows to the underside of the melt distributor 14 and prevents the underside of the melting crucible from cooling (additional source of heating for the melt distributor 14).

The flow velocity of the hot gas at the outlet from the mixing chambers 3 is less than 50 m/sec (mixing with atmospheric pressure) and due to the converging cross sectional form of the space 13 and the ejector effect of the debiteuse 16 it then continuously increases to the velocity of sound in the region of the debiteuse inlet 7. Due to the sharp edges of the part through which the flow is guided and the short length, amounting to only 2 to 5 mm, of the drawing nozzle inlet, a maximum pressure gradient is obtained in the region of the first fibre forming zone underneath the melt distributor 14. When the resting temperature of the hot gas (measured with the temperature probe 20) is, for example, 1,000° C., the velocity in the sound cross section at the drawing nozzle inlet 7 is 650 m/sec at a temperature of 787° C. Due to the expansion in the drawing nozzle to a pressure of 0.3 bar, the velocity increases to 823 m/sec when the local temperature is 658° C. The breaking up of the primary melt stream into fibres, which determines the fibre diameter, already takes place at the drawing nozzle 7. In the immediately downstream area of the drawing nozzle, these individual fibres are drawn out to a further extent. At the outlet end of the drawing nozzle, the flow velocity is reduced in known manner by a diffuser (see e.g. EP 38 989).

According to FIG. 3, the burners 1 are arranged vertically one behind the other parallel to both sides of the melt distributor 14. The combustion gas is supplied through combustion gas distributor pipes 21. The mixing chamber 3 is in its first part also vertical and contiguous with the burners 1 and is then bent over through 90° in its lower part (22) so that the mixing chambers are arranged with their outlet openings directed to the external surfaces of the melt distributor 14 as in the embodiment of FIG. 1. The connections 9 and 10 for cooling water are arranged similarly to those of FIG. 1 and 2. The air supply 12 is connected to an air distributing chamber 23 which corresponds to the air chamber 5 of FIG. 2.

In an alternative embodiment illustrated in FIGS. 4 and 5 the air is introduced through a tangential supply 24 at the circumference of the mixing chamber 3 near the burner 1. This ensures vigorous turbulence and thorough mixing with the combustion gases.

FIG. 6 shows another embodiment of the combustion and mixing chambers. The cross section of the mixing chamber 3 in this case widens out towards the outlet end and the space 13 in the form of a diffuser(25) at an angle of from 5° to 20°, preferably from 5° to 10°. This enables the incoming flow velocity in the space 13 to be reduced. The supply of air into the mixing chamber 3 is again provided by a tangential air supply 24.

EXAMPLE

When hot gas is supplied on both sides of the drawing nozzle 16 (see FIG. 1) at an outlet temperature from the mixing chambers 3 of 1273K, the speed of sound in the narrowest cross section of the drawing nozzle inlet 7 is 651 m/sec with a temperature of 1061K. Owing to the ejector effect of the driving jets 19 of the drawing nozzle 16, the flow expands to a pressure of 0.3 bar and is kept constant over a length of 50 mm without mixing. A velocity of hot gas flow of 863 m/sec is established under these conditions at a temperature of 902K. Under these conditions, very fine glass fibres with an average fibre diameter of 0.3 μm can be produced. Owing to the completely uniform temperature distribution in the whole fibre forming and drawing region, temperature differences in the region of the primary melt threads are avoided and cooling of the fibres is slowed down, and these factors combined with the high flow velocity ensure that the fibres will be drawn out to a greater extent and more uniformly. Measurements with a raster electron microscope showed a standard deviation of average fibre diameter of from 0.15 to 0.2 μm with an average value of 0.3 μm. Owing to the specified flow and temperature conditions for the drawing process, it is also possible to achieve a marked reduction in the proportion of non-fibrous components (beads, thickenings, bunches etc.).

We claim:

1. In a process for the production of mineral wool fibres, having a diameter of from 0.1 μm to 5 μm, by the blast drawing process, comprising breaking up streams of melt issuing from the melt outlet apertures (18) at the bottom of a melt distributor (14), into fibres in a drawing nozzle (16) situated downstream of the distributor by means of a blast medium flowing substantially parallel to the streams of melt, the blast medium being sucked into the drawing nozzle (16) by a pressure gradient, and the flow velocity being reduced in a diffuser situated downstream, the improvement wherein
   (a) an air stream, is directed into a combustion exhaust gas to form a homogeneous gas mixture having a temperature of 600° to 1500° C.,
   (b) said gas mixture is supplied into the interspace (13) between the underside of the crucible and the top edge of the drawing nozzle from opposite broadsides of the melt distributor,
   (c) feeding at least 80% but not more than 99% of the gas mixture into the inlet of the drawing nozzle while the remaining portion flows aside from the inlet,
   (d) and adjusting the flow velocity of the gas mixture in the interspace to a value below 100 m/s.

2. A process according to claim 1, wherein the mineral wool fibres are glass fibres.

3. A process according to claim 1, wherein the temperature of the hot gas at the drawing nozzle inlet (7) is measured and is automatically regulated by readjustment of the supply of combustion gas and/or air.

4. In an apparatus for the production of mineral wool fibres consisting of a melt distributor (14) with melt outlet apertures (18), a drawing nozzle (16) which is situated underneath the distributor and in which the primary melt threads issuing from the melt distributor (14) are broken up into fibres by the action of a hot gas and drawn out, and gas burners (1) for the production of the hot gas in the region above the drawing nozzle (16) and below the bottom of the melting crucible, the improvement wherein the gas burners (1) are arranged with their combustion chambers (3) situated laterally between the melt distributor (14) and the top edge (15) of the drawing nozzle, and the combustion chambers (3) are connected by bores (6) to air chambers (5) which are under a bias pressure of from 1.1 to 2.2 bar (absolute).

5. An apparatus according to claim 4, wherein combustion chambers which are designed as mixing chambers (3) for homogeneous mixing of the air fed in through the bores (6) and the combustion gases have a length of from 100 to 500 mm.

6. An apparatus according to claim 4, wherein the space (13) between the underside of the melt distributor (14) and the top edge (15) of the drawing nozzle, including the mixing chambers (3) forms a quasi closed system.

7. An apparatus according to claim 4 wherein the bores (6) for supplying air are inclined to the axis of the burner at an angle of from 0° to 30°.

8. An apparatus according to claim 4, wherein the supply of air is tangential (24) at the circumference of the mixing chamber (3).

9. An apparatus according to claim 4, wherein the mixing chambers (3) are curved over (22) through 90° and the hot gas is first fed in vertically and parallel to the streams of melt and then encounters the underside of the melt distributor (14) substantially horizontally from the angled off part.

10. A process according to claim 1, wherein the diameter of said fibres is 0.1–2 μm.

11. A process according to claim 1, the temperature of the hot gas is from 800° to 1400° C.

12. A process according to claim 1, wherein the flow velocity is adjusted to a value before 50 m/sec.

13. A process according to claim 1, wherein the excess of hot gas supplied with an excess of at least 1% and not more than 20% of the total quantity of the gas stream carried through the drawing nozzle 16.

14. An apparatus according to claim 5, wherein the combustion chambers have a length of from 200 to 400 mm.

* * * * *

UNITED STATES PATENT AND TRADEMARK OFFICE
CERTIFICATE OF CORRECTION

PATENT NO. : 4,838,917

DATED : June 13, 1989

INVENTOR(S) : Wagner et al.

It is certified that error appears in the above-identified patent and that said Letters Patent is hereby corrected as shown below:

Col. 6, line 51          Before the words "50 m/sec." delete "before" and substitute --below--.

Signed and Sealed this

Ninth Day of June, 1992

Attest:

DOUGLAS B. COMER

*Attesting Officer*      *Acting Commissioner of Patents and Trademarks*